Sept. 20, 1971  A. J. MARTEL ET AL  3,605,167
WING GUTTER CLEANER

Filed March 12, 1969  2 Sheets-Sheet 1

Andre J. Martel
Jerome E. Martel
INVENTORS

BY *Clarence A. O'Brien*
*and Harvey B. Jacobson*
Attorneys

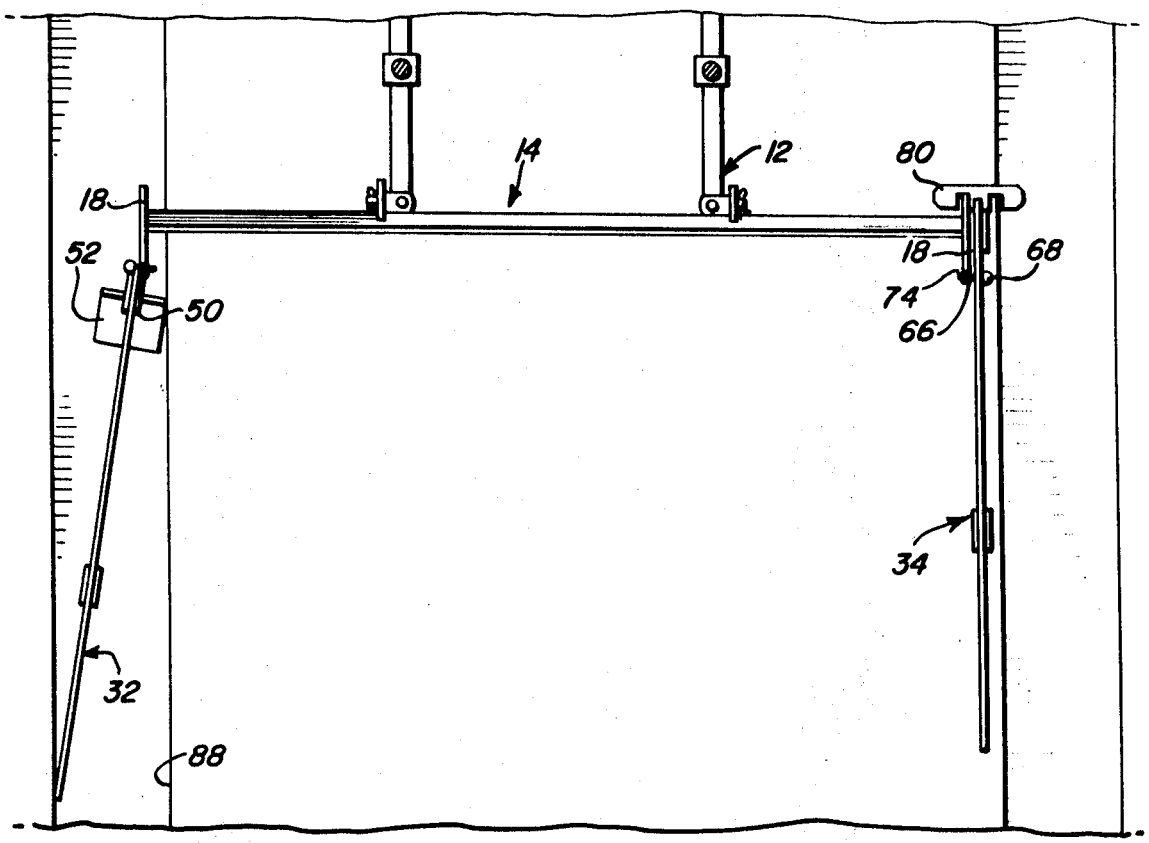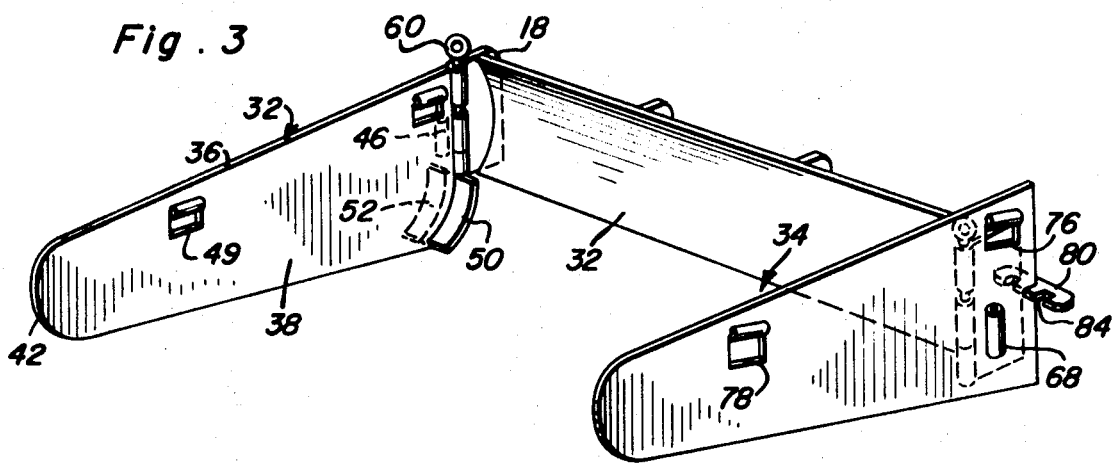

United States Patent Office 3,605,167
Patented Sept. 20, 1971

3,605,167
WING GUTTER CLEANER
Andre J. Martel and Jerome E. Martel, both of R.F.D. 2,
Williston, Vt. 05495
Filed Mar. 12, 1969, Ser. No. 806,408
Int. Cl. A01k 1/00
U.S. Cl. 15—236
8 Claims

ABSTRACT OF THE DISCLOSURE

An attachment for a rearwardly facing tractor lift arm mounted tractor blade. The attachment includes a pair of blade arms secured to and projecting rearwardly from the opposite ends of the blade for limited vertical floating relative thereto and one of the blades is disposed lower than the other and is slightly outwardly inclined toward its rear end and includes a ramp structure at its forward end for scooping manure upwardly out of a gutter in which the one blade is slidingly seated and along which the tractor blade is moving.

---

The attachment of the instant invention is adapted primarily for support from a rear mounted grader blade on a tractor and its prime function is to provide a means whereby manure may be elevated out of and pushed along gutters in a barn.

Barns are commonly provided with aisles along opposite sides of which animal stalls are disposed and the stalls are separated from the center portions of the aisles by means of gutters running along opposite sides of the aisles. These gutters are utilized to receive manure from the stalls when they are cleaned and the attachment of the instant invention, when mounted on a conventional tractor grader blade, may be utilized to efficiently clean the gutters and the aisle free of manure.

The attachment includes a pair of opposite side rearwardly extending and upstanding blade members secured to opposite end portions of a tractor blade with one of the blade members being disposed lower than the supporting grader blade and the other blade member. The lower blade member is floatingly supported from the grader blade and is slightly rearwardly and outwardly inclined toward the corresponding side of the path of movement of the corresponding tractor and the forward end of the lower blade member (in relation to the forward end of the tractor) includes ramp means for scooping the manure out of the gutter and into the aisle along whose surface the grader blade is being advanced during rearward movement of the associated tractor.

The main object of this invention is to provide a tractor attachment that may be readily utilized to clean manure from barn aisles and aisle gutters.

Still another object of this invention is to provide an attachment in accordance with the preceding object and including means by which the blade members supported from the grader blade of the tractor may be readily reversed in relation relative to each other and the grader blade thereby enabling the gutters along both sides of the aisle to be selectively cleaned.

Another important object of this invention is to provide an attachment which may be readily removably supported from an associated tractor grader blade having but two components of the attachment permanently secured thereto and from which the remaining components of the attachment may be readily removed.

A final object of this invention to be specifically enumerated herein is to provide an attachment in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a fragmentary elevational view of the assemblage illustrated in FIG. 2 and with portions of the tractor being broken away and illustrated in horizontal section;

FIG. 3 is a perspective view of the attachment shown mounted upon a conventional tractor grader blade.

Figure 1:
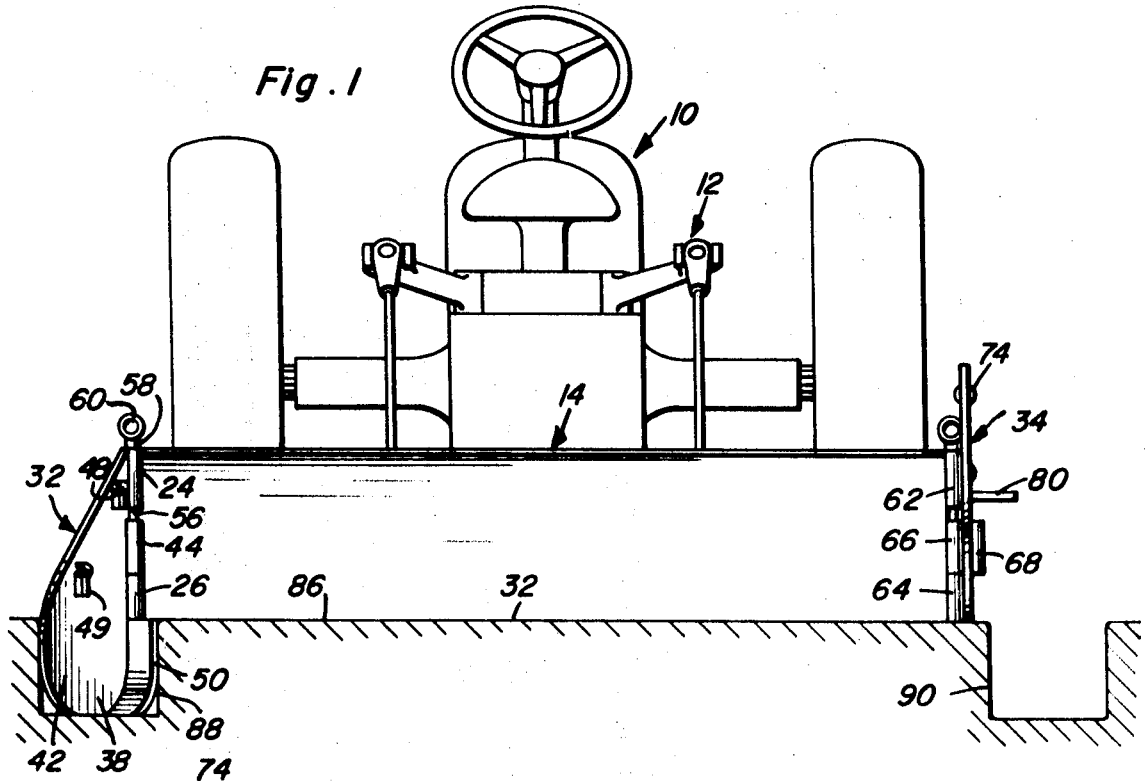
FIG. 1 is a rear elevational view of a tractor provided with a conventional grader blade upon which the attachment of the instant invention is operatively mounted and with the lower blade member of the attachment illustrated seated against the bottom of one of the gutters extending along the aisle upon which the tractor is being moved.

Referring now more specifically to the drawings the numeral 10 generally designates a conventional form of farm tractor which includes a lift arm assembly referred to in general by the reference numeral 12 from which a conventional grader blade generally referred to by the reference numeral 14 is supported.

It is to be understood that the lift arm assembly 12 may be actuated from the driver's position of the tractor 10 so as to raise and lower the grader blade 14.

The attachment of the instant invention is referred to in general by the reference numeral 16 and includes a pair of mounting plates 18. The mounting plates 18 include front and rear edge portions 20 and 22 and the rear edge portions 22 each have a pair of upper and lower sleeves 24 and 26 secured thereto. Each pair of sleeves 24 and 26 are longitudinally aligned and vertically spaced apart so as to provide an opening 28 therebetween.

The plates 18 are welded to the end edges of the grader blade 14 with the front edge portions 20 projecting forwardly of the corresponding ends of the blade 14. The rear edge portions 22 of the blades 18 and 20 project rearwardly from the corresponding ends of the blade 14 and the lower marginal edge portions 30 of the blades 18 and 20 are generally horizontally aligned with the lower marginal edge portions 32 of the grader blade 14.

The assembly or attachment 16 also includes a pair of blade members generally referred to by the reference numerals 32 and 34. The blade member 32 is horizontally elongated and includes upper and lower marginal edge portions 36 and 38 as well as front and rear marginal edge portions 40 and 42. The rear marginal edge portion 42 is somewhat rounded and the front marginal edge portion 40 has a pair of mounting sleeves 44 and 46 secured to the inner and outer surfaces of the blade member 32 intermediate its upper and lower marginal edge portions 36 and 38. The sleeves 44 and 46 are horizontally aligned and the blade member 32 has a pair of hand-grip forming openings 48 and 49 formed therein.

The blade member 32 also includes a pair of curved ramp plates 50 and 52 secured to its inner and outer surfaces adjacent the lower marginal edge portion 38 and the front marginal edge portion 40. The ramp plates 50 and 52 are similar and each is reinforced by means of a gusset plate 54. In order to support the blade member 32 from the plate 18, either the sleeve 44 or the sleeve 46 is disposed between and aligned with the sleeves 24 and 26 and a pin 56 having a head 58 on its upper end provided with an eye 60 is passed downwardly through the sleeve 24 and the sleeve 26 as well as the sleeve on the blade member 32 disposed between the sleeves 24 and 26.

The plate 18 includes a pair of upper and lower sleeves 62 and 64 similar to the sleeves 24 and 26 and the blade member 34 includes a pair of sleeves 66 and 68 similar to the sleeves 44 and 46. In addition, a pivot pin 70 provided with a head 72 having a lift eye 74 thereon is provided and may be downwardly inserted through the sleeves 62 and 64 and either the sleeve 66 or the sleeve 68 to support the blade member 34 from the plate 18.

In addition, the blade member 32 includes hand-grip defining openings 76 and 78 corresponding to the openings 48 and 50 and a sector plate 80 is secured to the rear marginal edge portion 82 of the blade member 34 and includes opposite end rearwardly opening notches 84. When the sleeve 66 is aligned with the sleeves 62 and 64 and receives the pivot pin 70 therethrough, the blade member 34 is supported from the blade 18 with the front edge portion 20 of the plate 18 seated in the notch 84 opening to the sleeve 66. However, the spacing between the sleeves 62 and 64 is substantially the same as the space between the sleeves 24 and 26 and the vertical extent of the sleeves 44 and 46 is substantially the same as the vertical extent of the sleeves 66 and 68. Accordingly, the blade members 32 and 34 may be reversed in positions on the plates 18 and when the blade member 34 is supported from the lower plate 18 in FIG. 4, the sleeve 68 of the plate 34 is disposed between and aligned with the sleeves 24 and 26 to receive the pivot pin or shaft 56 therethrough. Further, when the blade member 34 is supported from the lower plate 18 in FIG. 4, the forward edge portion 20 of that plate 18 is received in the groove 84 opening toward the sleeve 68.

Figure 4:
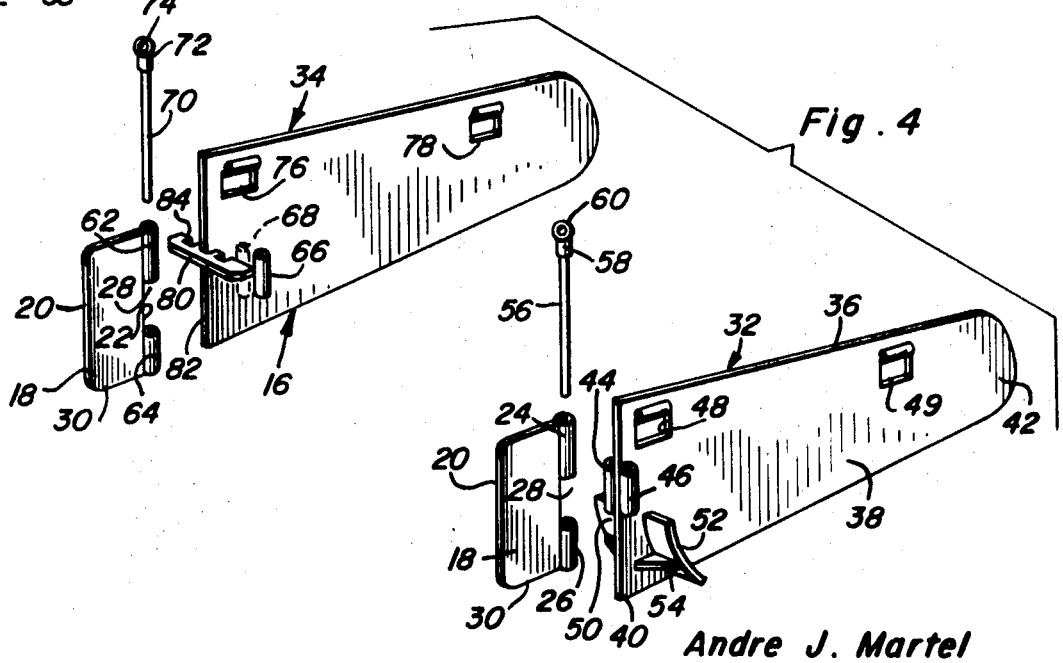
FIG. 4 is an exploded perspective view of the attachment.

From FIG. 4 of the drawings it will be noted that the sleeves 66 and 68 are spaced closer to the lower marginal edge portion of the blade member 34 than the spacing between the sleeves 44 and 46 and the lower marginal edge portion 38 of the blade member 32. Accordingly, the lower marginal edge portion of the blade member 38 is disposed below the lower marginal edge portion 32 of the scraper blade or grader blade 14 and the lower marginal edge portion of the blade member 34 is generally horizontally aligned with the lower marginal edge portion of the grader blade 14. When the attachment is assembled in the manner illustrated in FIGS. 1 and 3 of the drawings, the tractor 10 may be rearwardly advanced along the aisle 86 with the blade member 32 seated in the gutter 88 and the blade member 34 riding along the surface of the aisle 86 inwardly of the opposite gutter 90. The ramp plate 50 will cause manure within the gutter 88 and directed toward the inner marginal edge portion of the gutter 88 by the blade member 32 to be elevated upwardly to the level of the aisle 86 whereupon the manure will move, by the pressure of further manure being scooped up by the ramp plate 50, across the grader blade 14 toward the blade member 34. Of course, the blade member 34 acts as a fence to prevent the manure scooped from the gutter 88 moving completely across the grader blade 14 and into the gutter 90.

From FIGS. 1 and 3 of the drawings it will be noted that the vertical extent of the sleeves 44, 46, 66 and 68 is less than the spacing between the sleeves supported from the plates 18 and that the blade members 32 and 34 are therefore capable of shifting vertically a limited amount relative to the grader blade 14. This of course enables the blade members 32 and 34 to compensate for irregularities in the aisle and gutter surfaces.

When the blade member 32 is switched to the opposite end of the grader blade 14, the sleeve 46 is disposed between the sleeves 62 and 64 and the blade member 32 is inclined outwardly away from that end of the grader blade 14 so as to enable the ramp plate 52 to scoop manure from the gutter 90.

While the plates 18 are permanently secured to the ends of the grader blade, the lower marginal edge portions of the plates 18 can be elevated above the lower marginal edge portion 32 of the grader blade 14 thereby enabling conventional use of the grader blade 14 when desired.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an elongated scraper blade adapted to be advanced forwardly in the direction in which the blade faces, a gutter cleaning attachment including an upstanding blade member having front and rear end portions and inner and outer sides, support means supporting the rear end portion of said blade member from one end portion of said scraper blade and with the forward end of said blade member projecting forwardly and slightly outwardly of said one end portion of said scraper blade, the lower marginal edge of said blade member being disposed below the lower marginal edge of said scraper blade for sliding along the bottom surface of a gutter along which said one end portion of said scraper blade is being advanced, the rear end portion of said blade member including an upstanding ramp plate supported and projecting inwardly from the lower marginal edge portion of the inner side thereof and disposed in inclined position with its lower marginal edge spaced closer to the forward end portion of said blade member than the upper marginal edge portion thereof for elevating manure from the bottom of said gutter upwardly and outwardly of the latter and in front of the adjacent end of the scraper blade upon advancement of said blade member along the bottom of said gutter, the lower marginal edge of said ramp plate being generally horizontally aligned with the lower marginal edge of said blade member.

2. The combination of claim 1 wherein said support means includes means supporting said blade member from said scraper blade for limited vertical shifting relative to the latter.

3. The combination of claim 1 including a second blade member including front and rear ends, second support means supporting the rear end portion of said second blade member from the other end portion of said scraper blade with the front end portion of said second blade member projecting forwardly of said scraper blade, the lower marginal edge portion of said second blade member being generally horizontally aligned with the lower marginal edge portion of said scraper blade, said second blade member defining a fence against which manure from said gutter may be collected.

4. In combination with an elongated scraper blade adapted to be advanced forwardly in the direction in which the blade faces, a gutter cleaning attachment including an upstanding blade member having front and rear end portions and inner and outer sides, support means supporting the rear end portion of said blade member from one end portion of said scraper blade and with the forward end of said blade member projecting forwardly and slightly outwardly of said one end portion of said scraper blade, the lower marginal edge of said blade member being disposed below the lower marginal edge of said scraper blade for sliding along the bottom surface of a gutter along which said one end portion of said scraper blade is being advanced, the rear end portion of said blade member including ramp means projecting inwardly from the lower marginal edge portion of the inner side thereof for elevating manure from the bottom of said gutter upwardly and outwardly of the latter and in front of the adjacent end of the scraper blade upon advancement of said blade member along the bottom of said gutter, a second blade member including front and rear ends, second support means supporting the rear end portion of said second blade member from the other end portion of said scraper blade with the front end portion of said second blade member projecting forwardly of said scraper blade, the lower marginal edge portion of said second blade being generally horizontally aligned with the lower marginal edge portion of said scraper blade, said second blade member defining a fence against which manure from said gutter may be collected, the first mentioned support means, said second support means and said blade members including coacting means supporting said blade members for reversible positioning on said end portions of said scraper blade and with the lower marginal edge portion of the first mentioned blade member spaced below the lower edge portion of said scraper blade and the first mentioned blade member forwardly and outwardly inclined relative to the other end portion of said scraper blade when the first mentioned blade member is supported from said other end portion of said scraper blade.

5. The combination of claim 4 wherein said support means each include a single axially removable mounting pin which comprises the only removable component of the corresponding support means which need be removed to release the corresponding blade member.

6. The combination of claim 1 wherein said support means includes means removably supporting said blade member from said one end portion of said scraper blade and means operative to selectively removably support said blade member from the other end portion of said scraper blade with the front end of said blade member projecting forwardly and outwardly of said other end portion of said scraper blade and the lower marginal edge portion of said blade member disposed below the lower marginal edge portion of said scraper blade, said blade member also including an upstanding inclined ramp plate supported and projecting outwardly from the outer side thereof and operable to perform the function of the first mentioned ramp means when said blade member is supported from said other end portion of said scraper blade.

7. The combination of claim 6 wherein said support means includes means supporting said blade member from said scraper blade for limited vertical shifting relative to the latter, when said blade member is supported from either end portion of said scraper blade.

8. The combination of claim 1 including a second blade member including front and rear ends, second support means supporting the rear end portion of said second blade member from the other end portion of said scraper blade with the front end portion of said second blade member projecting forwardly of said scraper blade, the lower marginal edge portion of said second blade member being generally horizontally aligned with the lower marginal edge portion of said scraper blade, said second blade member defining a fence against which manure from said gutter may be collected.

References Cited

UNITED STATES PATENTS 2,165,314.   7/1939   Stevenson _____ 37—53

FOREIGN PATENTS 962,945   3/1963   Great Britain _____ 15—93B

BILLY J. WILHITE, Primary Examiner
L. G. MACHLIN, Assistant Examiner

U.S. Cl. X.R.

15—93(B)